(12) United States Patent
Hammond et al.

(10) Patent No.: US 10,898,982 B2
(45) Date of Patent: Jan. 26, 2021

(54) CALIBRATION DEVICE AND METHOD

(71) Applicants: RENISHAW PLC, Wotton-under-Edge (GB); METROLOGY SOFTWARE PRODUCTS LIMITED, Alnwick (GB)

(72) Inventors: Peter Russell Hammond, Warkworth (GB); Christopher Leonard Copper, Alnwick (GB)

(73) Assignees: RENISHAW PLC, Wotton-under-Edge (GB); METROLOGY SOFTWARE PRODUCTS LIMITED, Alnwick (GB)

( * ) Notice: Subject to any disclaimer, the term of this patent is extended or adjusted under 35 U.S.C. 154(b) by 190 days.

(21) Appl. No.: 16/069,360

(22) PCT Filed: Jan. 10, 2017

(86) PCT No.: PCT/GB2017/050040
§ 371 (c)(1),
(2) Date: Jul. 11, 2018

(87) PCT Pub. No.: WO2017/121990
PCT Pub. Date: Jul. 20, 2017

(65) Prior Publication Data
US 2018/0369977 A1 Dec. 27, 2018

(30) Foreign Application Priority Data
Jan. 12, 2016 (EP) .................... 16150852

(51) Int. Cl.
*B23Q 17/22* (2006.01)
*G01B 21/04* (2006.01)
*G05B 19/401* (2006.01)

(52) U.S. Cl.
CPC ....... *B23Q 17/2233* (2013.01); *G01B 21/042* (2013.01); *G05B 19/401* (2013.01); *G05B 2219/37008* (2013.01); *G05B 2219/37619* (2013.01)

(58) Field of Classification Search
CPC ...... B23Q 16/00; B23Q 17/22; G01B 21/042; G01B 21/047; G01B 5/25
See application file for complete search history.

(56) References Cited

U.S. PATENT DOCUMENTS

| | | |
|---|---|---|
| 5,072,174 A | 12/1991 | Weber |
| 6,973,738 B2 | 12/2005 | Kaneda et al. |

(Continued)

FOREIGN PATENT DOCUMENTS

| | | |
|---|---|---|
| CN | 201483300 U | 5/2010 |
| CN | 201514206 U | 6/2010 |

(Continued)

OTHER PUBLICATIONS

English machine translation for DE29720584.*

(Continued)

*Primary Examiner* — Daniel S Larkin
*Assistant Examiner* — Anthony W Megna Fuentes
(74) *Attorney, Agent, or Firm* — Oliff PLC

(57) ABSTRACT

A calibration device for a machine tool is described that includes a base attachable to a machine tool and a calibration artefact, such as a sphere of known radius. A deflection mechanism attaches the calibration artefact to the base and allows movement of the calibration artefact relative to the base when an external force is applied to the calibration artefact. The deflection mechanism also maintains the calibration artefact in a defined rest position relative to the base in the absence of an applied external force. A sensor is provided for sensing the extent of movement of the calibration artefact relative to the base. A method of using the device with a reference tool to accurately determine a position of a calibration artefact is also described.

16 Claims, 3 Drawing Sheets

(56) References Cited

U.S. PATENT DOCUMENTS

| | | | | |
|---|---|---|---|---|
| 9,863,766 | B2* | 1/2018 | Wallace | G01B 21/042 |
| 2004/0093179 | A1* | 5/2004 | Sutherland | B82Y 15/00 |
| | | | | 702/104 |
| 2004/0244464 | A1* | 12/2004 | Hajdukiewicz | G01B 21/042 |
| | | | | 73/1.79 |
| 2006/0173651 | A1* | 8/2006 | Ferrari | G05B 19/401 |
| | | | | 702/168 |
| 2010/0018069 | A1* | 1/2010 | Ould | G01B 21/042 |
| | | | | 33/503 |
| 2010/0319207 | A1* | 12/2010 | Held | G01B 21/042 |
| | | | | 33/503 |

FOREIGN PATENT DOCUMENTS

| | | |
|---|---|---|
| CN | 201841440 U | 5/2011 |
| DE | 29720584 U1 | 8/1998 |
| EP | 0375622 A1 | 6/1990 |
| EP | 1162030 A2 | 12/2001 |
| EP | 2259160 A1 | 12/2010 |
| EP | 2390622 A1 | 11/2011 |
| JP | 2006-289608 A | 10/2006 |
| WO | 02/32620 A1 | 4/2002 |
| WO | 2015/162431 A1 | 10/2015 |

OTHER PUBLICATIONS

English machine translation for EP2390622.*

Apr. 12, 2017 Search Report issued in International Patent Application No. PCT/GB2017/050040.

Apr. 12, 2017 Written Opinion issued in International Patent Application No. PCT/GB2017/050040.

Jul. 11, 2016 Extended European Search Report issued in European Patent Application No. 16150852.8.

* cited by examiner

- ♦ Sphere At Rest
- ■ Extrapolated Movement
- —— Linear (Sphere At Rest)
- --- Linear (Extrapolated Movement)

CALIBRATION DEVICE AND METHOD

The present invention relates to a calibration device for use with machine tools and a method of using such a device.

Numerically controlled machine tools are widely used in manufacturing industry to cut parts, such as metal parts for vehicles, aircraft etc. In order to cut features with a high level of accuracy (e.g. to within a few microns) it is necessary to calibrate such machine tools. This is especially the case when using five axis machine tools in which the orientation of the part relative to the cutting tools is varied during the cutting procedure.

A key part of a typical calibration procedure, especially for five axis machine tools, is establishing the position of the centre of a calibration sphere relative to the home position of the machine tool. Once established, the sphere centre can then act as a machine datum point on which all subsequent calibration procedures are based.

It is known to establish the sphere centre position in a plane parallel to the machine tool bed (typically termed the XY plane) using a dial test indicator or a touch probe mounted in the spindle of the machine tool. Measuring the sphere centre position along the axis perpendicular to the machine tool bed (typically termed the Z-axis) is more complicated and to date has only been possible using various manual procedures. For example, it is known to move a reference tool of known length along the z-axis towards the calibration sphere under manual control. The reference tool is advanced towards the sphere until a gauge block of known thickness is just "nipped" between the reference tool and sphere. Such manual procedures can be inaccurate and the results of the calibration have been found to vary from operator to operator.

DE29720584 describes a tool-setting device for measuring the length and diameter of tools. EP2390622 describes an apparatus for calibrating a machine tool that includes three spaced apart transducers for measuring the positon of a ball carried on a rod that is held in the spindle of the machine tool.

According to a first aspect of the invention, there is provided a calibration device for a machine tool, comprising; a base attachable to a machine tool, a calibration artefact having one or more known dimensions, a deflection mechanism that attaches the calibration artefact to the base and allows movement of the calibration artefact relative to the base when an external force is applied to the calibration artefact, the deflection mechanism also maintaining the calibration artefact in a defined rest position relative to the base in the absence of an applied external force, and a sensor for sensing the extent of movement of the calibration artefact relative to the base.

The present invention thus provides a calibration device for use when calibrating a machine tool. The device comprises a base that is attachable to a machine tool; for example, the base may be bolted or magnetically secured to the machine tool bed. A calibration artefact, such as a sphere of known radius, is attached to the base via a deflection mechanism. In the absence of an external force, the deflection mechanism holds the calibration artefact in a known and repeatable position relative to the base. If a sufficiently large external force is applied to the calibration artefact (e.g. a force above a certain magnitude), the deflection mechanism permits the calibration artefact to move relative to the base. The sensor measures the extent of any such movement of the calibration artefact relative to the base. For example, the sensor may output a stream of data that describes how far the calibration artefact has moved from its defined rest position.

The calibration device of the present invention is advantageously used as part of a machine tool calibration process. The device of the present invention can perform the same function as a rigidly mounted calibration sphere; i.e. a calibration artefact in the form of a sphere can be used to define a reference or datum position (e.g. at the sphere centre point) for use in a variety of measurement probe based calibration procedures. However, the ability to deflect the calibration artefact (e.g. using a reference tool of known length mounted in the machine tool spindle) and to also measure the extent of deflection (i.e. using the sensor) gives the advantage that the rest position of the calibration artefact can be found accurately. For example, if the calibration device comprises a calibration artefact in the form of a calibration sphere, the sphere centre z-position can be found using an automated procedure using the deflection measured by the sensor as a reference tool is driven into and deflects the calibration sphere. This avoids the need to use the manual process described above in which a reference tool is advanced towards a fixed sphere until a gauge block of known thickness is just "nipped" between the reference tool and sphere.

The calibration device of the present invention thus permits automated calibration that not only provides improved accuracy but also removes the variations that can occur when different engineers perform the same manual calibration process using a calibration gauge block.

It should be noted that the calibration device of the present invention has a different structure to a tool-setter of the type described in DE29720584 (mentioned above) and is also used for a quite different purpose. The deflectable tool-setting disks provided on the top and side of the tool-setter of DE29720584 (i.e. disks 9 and 19 shown in FIG. 1) are not calibration artefacts because they do not have a known (i.e. calibrated) size. The tool setter of DE29720584 thus allows a tool length or diameter to be measured but does not allow any kind of reference or datum position to be established that can then be used for machine tool calibration.

The calibration device of the present invention also has several advantages over the apparatus of EP2390622. In particular, the device of EP2390622 is complex to manufacture, configure and use. A special reference tool having a sphere mounted to its distal end is also required. In contrast, the calibration device of the present invention enables a simpler and easier to use calibration technique to be performed.

The device of the present invention may include any suitable calibration artefact. The calibration artefact is any artefact having a dimension or dimensions that are known (i.e. the calibration artefact has a known size). For example, the one or more dimensions of the artefact may be known by prior measurement to a calibrated standard. For example, the one or more dimensions of the artefact may have been previously measured on a coordinate measuring machine (CMM) that is calibrated to a relevant (national or international) calibration standard. The calibration artefact may comprise a cube, a disc (e.g. having a known radius) or a partial sphere etc.

Advantageously, the calibration artefact comprises a sphere. The sphere may have a known radius. A sphere of known radius is preferred for simplicity and accuracy because it is possible to determine the position of the sphere centre (e.g. in x, y, z coordinates) by measuring the position of a plurality of points on the sphere's surface.

The calibration artefact may be attached to the base, via the deflection mechanism, in any suitable manner. The calibration artefact may be spaced apart from the base by a distance that ensures the base interferes as little as possible with measurements of the calibration artefact. Advantageously, the calibration artefact is attached to a rod that protrudes from the base. For example, a calibration sphere may be attached to the distal end of a rod that extends out from the base.

The deflection mechanism ensures that, in the absence of an external force, the calibration artefact adopts a defined rest position relative to the base. In other words, the calibration artefact may be deflected relative to the base but each time the deflecting force is removed it returns to the same position relative to the base.

Any suitable biasing mechanism, active or passive, may be used for this purpose. Advantageously, the deflection mechanism comprises a spring for biasing the calibration artefact into the defined rest position. A plurality of springs may also be used. The spring(s) may be of any suitable type, e.g. a coil spring, leaf spring etc.

It is preferred that the calibration artefact is biased into the defined rest position with a force (e.g. a spring force) that is high enough to prevent deflection of the calibration artefact relative to the body when the position of the calibration artefact is being measured by a measurement probe. The calibration artefact is thus preferably maintained in the rest position when it is touched by a measurement probe or the like. Conveniently, the force that biases the calibration artefact into the defined rest position is greater than the force that would be applied to the calibration artefact during a process in which points on the surface of the calibration artefact are measured using a measurement probe. It should be noted here that the force applied by a measurement probe, such as a touch trigger probe, during measurement is relatively low (e.g. of the order of 10 Newtons). The deflection mechanism may apply a sufficient force to ensure the calibration artefact does not deviate from the defined rest position during normal probing activities, regardless of the orientation of the device. In other words, it is preferred the device can be used (and measured by a probe) in any required orientation; e.g. vertically, horizontally, upside-down etc.

The deflection mechanism preferably has complementary engaging features that define a repeatable position when brought into engagement. For example, a ball may engage a plurality of features defining a recess. The repeatable position may be kinematically defined (e.g. so that at least five, or preferable six, degrees of freedom of motion between the complementary features are constrained). Advantageously, the deflection mechanism comprises a first part attached to the calibration artefact and second part attached to the body. The first and second parts may be configured so as to adopt a repeatable position relative to one another when brought into engagement. For example, the first part may comprise a ball and the second part may comprise a seat for receiving the ball. Alternatively, a precise linear bearing and an end stop may be employed. The first and second parts may define a kinematic or pseudo-kinematic connection or joint.

The calibration artefact may be free to deflect in a plurality of directions relative to the body. For example, it may be able to move along the X, Y and Z axes. Preferably, the calibration artefact is constrained to move along a single linear axis relative to the body. In other words, the attachment mechanism preferably permits only linear motion of the calibration artefact relative to the body.

The sensor may sense motion along some or all of the directions of motion of the calibration artefact relative to the body. If linear motion alone is permitted, a single axis displacement sensor may be provided. For example, the sensor may comprise a transducer (e.g. a linear transducer) for measuring linear motion.

Measurements taken by the sensor may be output in any suitable manner. For example, a cable may be used to carry measurement data. Advantageously, a wireless transmitter is provided for transmitting measurements taken by the sensor. The wireless transmitter may provide optical transmission. Conveniently, the wireless transmitter is a radio frequency transmitter (e.g. a Bluetooth transmitter). The device may also be arranged to receive information over the same wireless link. The measurements may be output as, or shortly after, they are taken. Alternatively, a series of measurements may be acquired, stored and subsequently output by the device.

In addition to the sensor, the device may comprise an additional sensing mechanism that provides a safety or back-up function to protect the machine tool from damage. For example, a micro-switch may be provided that stops machine tool movement (e.g. in case a wireless system has failed or not turned-on). Such a limit switch may be of any suitable type.

The base of the device is attachable to a machine tool. For example, the base may be configured for attachment to the bed or table of a machine tool. This may be via bolt holes, magnets or the like. Preferably, the base can be immoveably and releasably secured to the machine tool. A cover may be provided to protect the device when not in use.

The present invention also extends to a kit that comprises the device described above and a reference tool for mounting in the spindle of a machine tool. The kit may also or alternatively comprise a measurement probe. The measurement probe may be a spindle probe for mounting in the spindle of a machine tool.

According to a second aspect of the invention, a method of using the calibration device according to the first aspect is provided. The method preferably comprises the step of mounting the calibration device to the machine tool, for example to the machine tool table where the object to be measured is usually placed. Once mounted to the machine tool, the device may be used as part of a calibration procedure. Conveniently, the method comprises the step of moving a reference tool held by the spindle of the machine tool into contact with the calibration artefact of the calibration device. The contact may cause deflection of the calibration artefact. A step of measuring a position of the calibration artefact may also be performed. The deflection of the calibration artefact may be used to measure a position thereof.

In a preferred embodiment, the calibration artefact of the calibration device comprises a sphere. The method may then comprise measuring a position of the centre of the sphere. For example, the position of the sphere centre in one axis (e.g. the sphere centre z-position) may be measured. As explained above, this may be done using an automated measurement procedure. The method may be performed in conjunction with a measurement probe based calibration method; e.g. with the probe-on-probe calibration method described in WO2015/162431.

Also described herein is a calibration device comprising an artefact, a body and a sensor for measuring movement of the artefact relative to the body. The artefact may be a calibration artefact (i.e. an artefact having one or more dimensions that are known). The artefact may comprise a sphere. A mechanism may be provided that constrains motion of the calibration artefact relative to the body. For example, the calibration artefact may be constrained to move along a single linear axis relative to the body. The body may be configured for attachment to a machine tool; e.g. it may be attachable to the table or bed of a machine tool. The sensor may measure the extent of motion of the artefact relative to the body; i.e. it may generate an output that varies in relation to the position of the artefact relative to the body. The device may have any one or more of the features described above in connection with the first and second aspects of the invention or described below for the specific embodiments.

The invention will now be described, by way of example only, with reference to the accompanying drawings in which.

Figure 1:
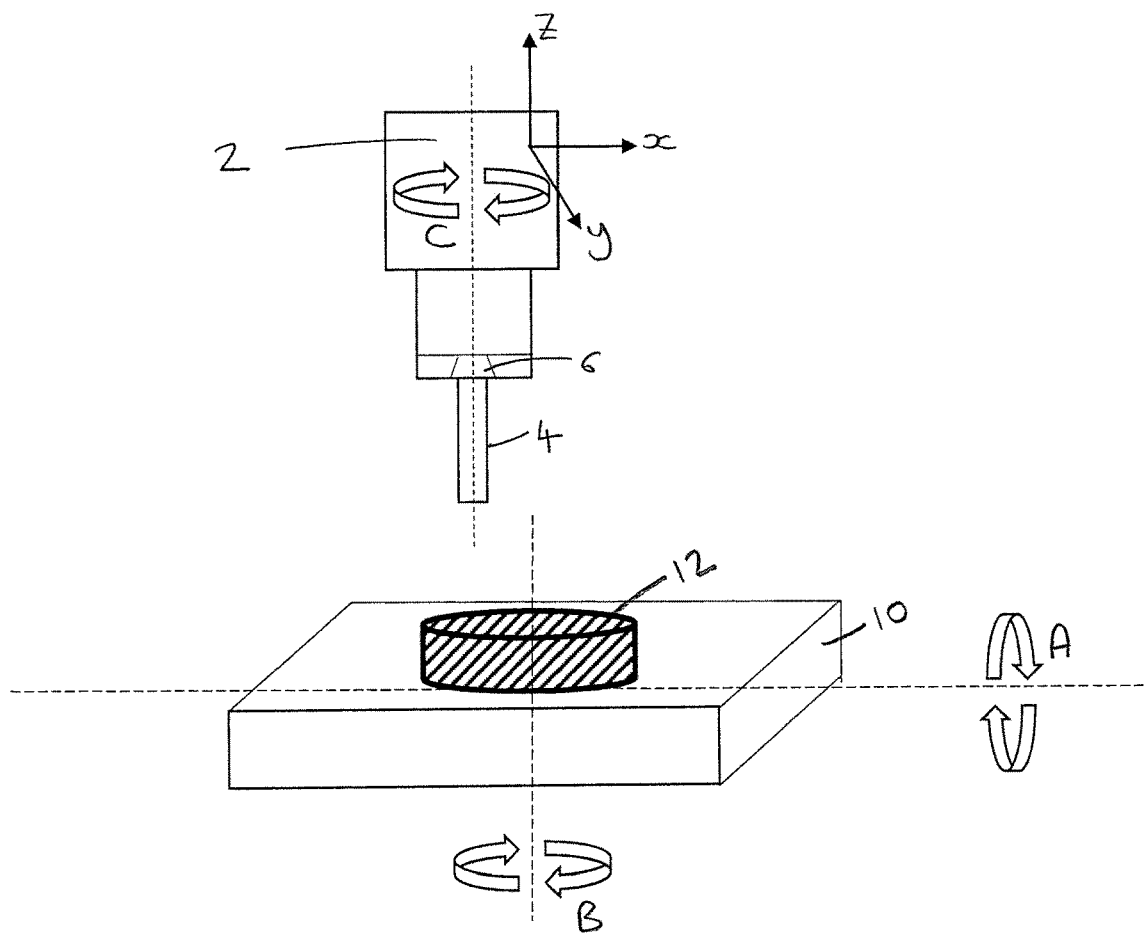
FIG. 1 shows a multi-axis machine tool.

FIG. 1 illustrates a multi-axis machine tool. The machine tool comprises a spindle 2 that can be rotated at high speed about what is typically termed the C-axis. The spindle 2 comprises a taper mount 6 for receiving the tapered shank of a cutting tool 4 or other accessory such as a measurement probe; this allows tools and accessories to be loaded into the spindle 2 as and when they are required. The spindle 2 can be moved about in space by the machine tool along three linear axes; these machine axes are typically termed the X, Y and Z axes. A table 10 is provided on which a workpiece 12 is mounted. The table 10 can be tilted about the A-axis and also rotated about the B-axis.

During cutting, the cutting tool 4 is rotated at high speed about the C-axis and the machine tool controller follows a list of instructions defined in a cutting program to move the tool 4 along a desired cutting path relative to the workpiece 12. The cutting path can include translational motion of the spindle along the X, Y and Z axes as well as rotational motion about the A and B axes. In order to remove the required material from the workpiece, it can be seen that the position of the tool tip relative to the workpiece has to be known very accurately, even when rotational motion about the A and B axes occurs. A variety of techniques and devices have thus been developed over the years to perform such calibration.

As would be well known to those skilled in the art, many automated machine tool calibration techniques involve using a spindle mounted measurement probe to take various measurements of a calibration sphere (i.e. a sphere of known radius) mounted to the machine tool bed. These measurements typically rely on knowing to a high level of accuracy the location of the centre of a calibration sphere relative to the home position of the machine tool (e.g. the origin of the x, y, z machine tool coordinate system). A variety of techniques have thus been developed over the years to measure sphere centre position accurately.

Figure 2:
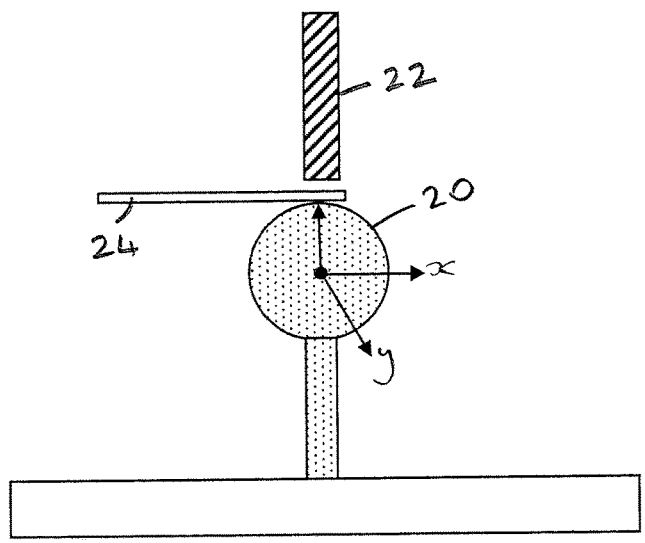
FIG. 2 shows a prior art calibration sphere based technique.

Referring to FIG. 2, a prior art technique will be described that allows the position of the centre of a calibration sphere 20 mounted to the bed of the machine tool to be determined. The sphere may be fixed to the base or another structure within the machine tool where the workpieces are usually placed. The sphere may thus be mounted onto the work surface of the machine tool, which may comprise one or more rotary axes of the machine tool.

It should firstly be noted a number of techniques are known that allow the XY position of a calibration sphere to be established with a high level of accuracy. For example, a dial test indicator (DTI) may be mounted into the spindle of the machine tool and used to "clock" the diameter of the calibration sphere 20, near the equator of the sphere. This is typically done by jogging (i.e. moving under manual control) the X and Y positions until the dial indicator does not deflect when the spindle is rotated. When this has been achieved the XY position of the spindle is the centre position of the sphere.

It is also known to measure the XY sphere centre position using a touch trigger probe that is mounted in the spindle of the machine tool. The spindle rotational position (i.e. the angle of rotation about the C-axis) is oriented to zero degrees and the sphere centre is measured and the XY position of the sphere centre recorded. The spindle is then rotated by 180° and the XY position of the sphere centre is re-measured. The average between the two measured XY sphere centre positions is used as the centre location; i.e. any error through eccentric mounting of the touch probe spherical stylus relative to the rotational centre of the spindle is eliminated.

Although the above described techniques allow the XY sphere centre position to be found, they are typically unable to establish the Z position of the sphere with sufficient accuracy for four or five axis machine tools. A number of separate techniques are thus known for determining the Z-position of the sphere.

The most commonly used technique is illustrated in FIG. 2 and involves the use of a so-called feeler gauge block 24. A reference tool 22 of known, calibrated, length is loaded into the spindle of the machine tool. The spindle is moved so that the reference tool 22 is positioned over the top dead centre of the sphere 20. A feeler gauge or gauge block 24 is positioned between the end of the reference tool 22 and the sphere 20. Using the manual "jog" function of the machine tool, the tool is manually moved down until the gauge block 24 is just "nipped" between the reference tool 22 and the sphere 20. This manual process requires the engineer to "feel" when the gauge is free to move, but there is no play or clearance gap. When this is achieved the current machine position, the length of the tool and the calibrated sphere radius are used to calculate the centre Z position of the sphere.

It is also known to use bespoke length setting devices to set the Z-position. A device called the Base-Master is supplied by Metrology Software Products limited, Alnwick, UK that comprises a repeatable uni-directional indicator. The indicator is mounted into the spindle of the machine tool and positioned over the XY centre of the sphere. The jog control of the machine tool is used to move the spindle down until the Base-Master is just in contact with the top of the sphere, such contact being indicated by an LED mounted on the Base-Master device. The (known) length of the Base-Master, the current Z-position and the sphere radius are then used to calculate the centre of the sphere in the z-axis.

The above described techniques for determining the z-position of a sphere all require manual intervention in what is otherwise an automated calibration procedure. This requires skilled calibration engineers (rather than machine tool operators) to perform the procedure and it has been found that significant variations in the calibration error can occur when different engineers perform the same procedure.

Figure 3:
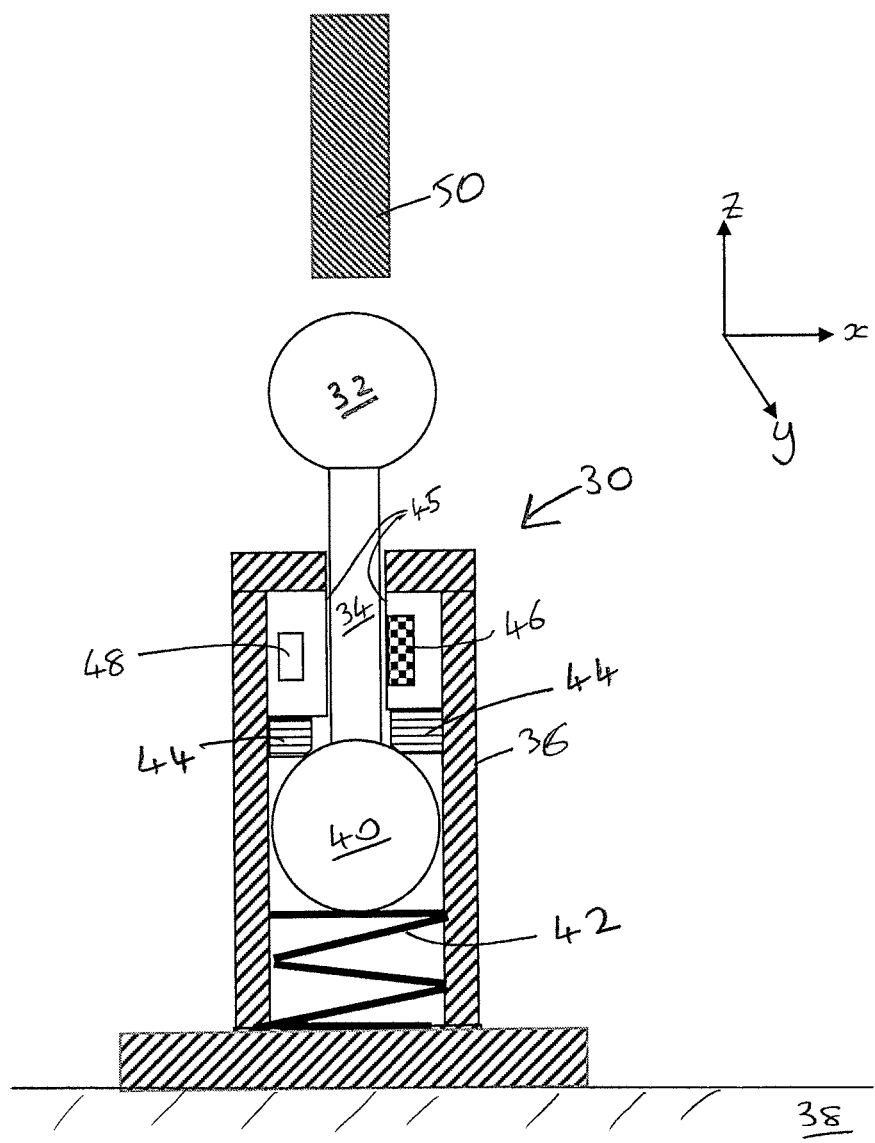
FIG. 3 shows a calibration device of the present invention.

Referring to FIG. 3, a calibration device 30 and associated method of the present invention will be described that allows the centre of a calibration sphere 32 to be accurately determined.

The calibration device 30 comprises a calibration sphere 32 mounted to the distal end of a shaft 34. The calibration sphere 32 and part of the shaft 34 protrude from a device body or base 36 that is configured for attachment to the table or bed 38 of a machine tool. A positioning sphere 40 is attached to the proximal end of the shaft 34 and contained with the base 36. The positioning sphere 40 is urged by a spring 42 into contact with a seat 44. The positioning sphere 40 and the seat 44 are arranged to adopt an accurate and repeatable position relative to each other when they are urged into contact with each other. In this example, the seat 44 and positioning sphere 40 provide a repeatable joint, but alternative repeatable joints could be used. This arrangement of positioning sphere 40, seat 44 and spring 42 provide a deflection mechanism that mounts the calibration sphere 32 to the base 36.

The shaft 34 extends through an elongate aperture defined within the base 36 that has side walls 45 that constrain lateral motion of the shaft 34. It can thus be seen that a force applied to the calibration sphere 32 along the z-axis will cause the positioning sphere 40 to push against the spring 42. If sufficient force is applied, the spring force will be overcome and the positioning sphere 40 will disengage from the seat 44 thereby causing linear translation (along the z-axis) of the calibration sphere 32, shaft 34 and positioning sphere 40. The force applied by the spring 42 is set to be sufficiently high for there to be no translation of the calibration sphere 32 when the forces typically required to take measurements of sphere position using a touch trigger measurement probe are applied. A linear transducer 46 within the base 36 is provided to measure the amount of such linear translation and the measurement from the transducer are output via a wireless Bluetooth transmitter 48, although alternative ways of transmitting the data are possible.

In use, the device 30 is secured to the bed 38 of the machine tool (e.g. using bolts or a magnetic clamping force) with the elongate axis of the shaft 34 aligned to the z-axis of the machine tool. The centre location of the calibration sphere 32 is then "roughly" located, optionally using a spindle mounted touch trigger measurement probe. A reference tool 50 of known length is loaded into the spindle of the machine tool.

The following measurement process is then performed using standard Macro program based commands programmed into the numerical controller of the machine tool. Firstly, the reference tool 50 is positioned over the top dead centre of the sphere 32. An NC-Macro program is then called to trigger the "Start Sphere Find" process; this program indicates to the external controller that the reference tool 50 is ready for use. The controller then commands the calibration device 30 to "turn on" and a hand shake procedure is conducted to confirm this has happened.

The reference tool 50 is then moved towards the sphere 32 (i.e. down along the z axis) by a small predefined distance and an NC-Macro call is made to trigger a "Sphere Position Read" in which the controller reads the current machine Z-position and the measured value from the transducer 46 of the calibration device 30. These advance and read steps are repeated multiple times. This produces a series of Z-positions and corresponding transducer values.

Figure 4:
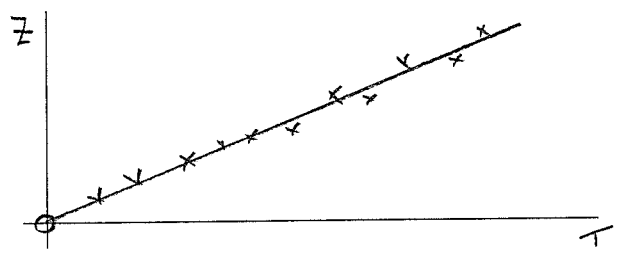
FIG. 4 shows how the sphere z-height can be determined by extrapolation.

As shown in FIG. 4, the recorded Z positions can be plotted against the transducer readings T. Linear extrapolation can then be used to calculate the position of the top dead centre of the sphere at zero transducer deflection (i.e. the value of Z when T indicates the sphere is at its home position).

The above method would require bi-directional communication. As an alternative, it is possible to use only unidirectional output from the device, beginning from the stage immediately after the initial power-on has been performed. The reference tool 50 is then moved towards the sphere 32 (i.e. down along the Z axis) by small increments of predefined distance, with small delays in between each move to allow the machine to fully come to rest and the transducer measurement to reach a constant value. After several movements of this type have successfully moved the sphere, the reference tool 50 is withdrawn to allow the sphere 32 to reseat back to the repeatable "at rest" position.

Throughout this process, any appropriate system (PC based software, a proprietary embedded device within the calibration device, a separate embedded system or the machine tool controller itself) can store the transducer readings T. By recording this stream of transducer measurements for later processing at the end of the movement sequence, this process is entirely free from any machine tool specific synchronisation mechanisms and requires no customisation for use on a particular type of machine tool.

Figure 5:
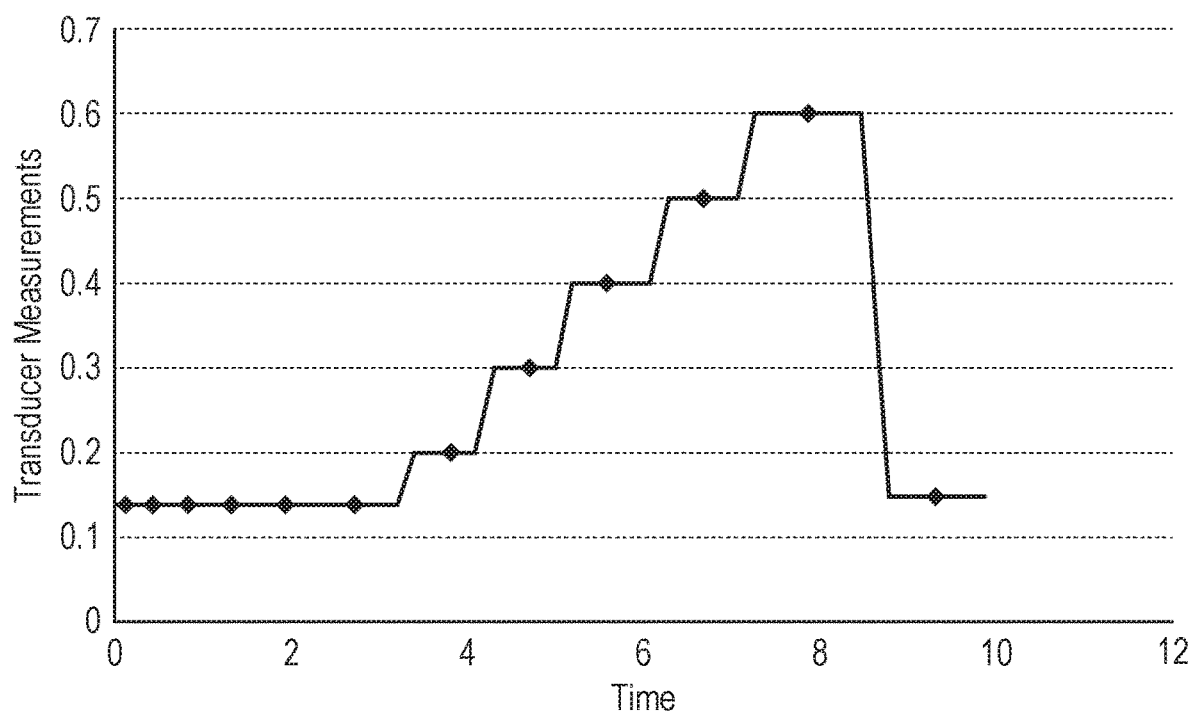
FIG. 5 shows an example plot of detected sphere movement over time by the transducer.

FIG. 5 shows an example data stream that may be produced by moving towards the sphere in 0.1 unit increments in Z until a total movement of 1.0 unit has been achieved. The "at rest" position of the sphere can be determined to be the start and end (after direction reversal) flat readings on the graph. The long flat portion at the start may be due to movement of the machine prior to contacting the sphere and the variation in duration between each flat portion of the graph may be due to the machine tool operator overriding the feed rate of the machine tool or possibly a variable time delay during communications. A key advantage of this implementation of the technique is that the method does not required synchronised time readings, communications or movement.

Figure 6:
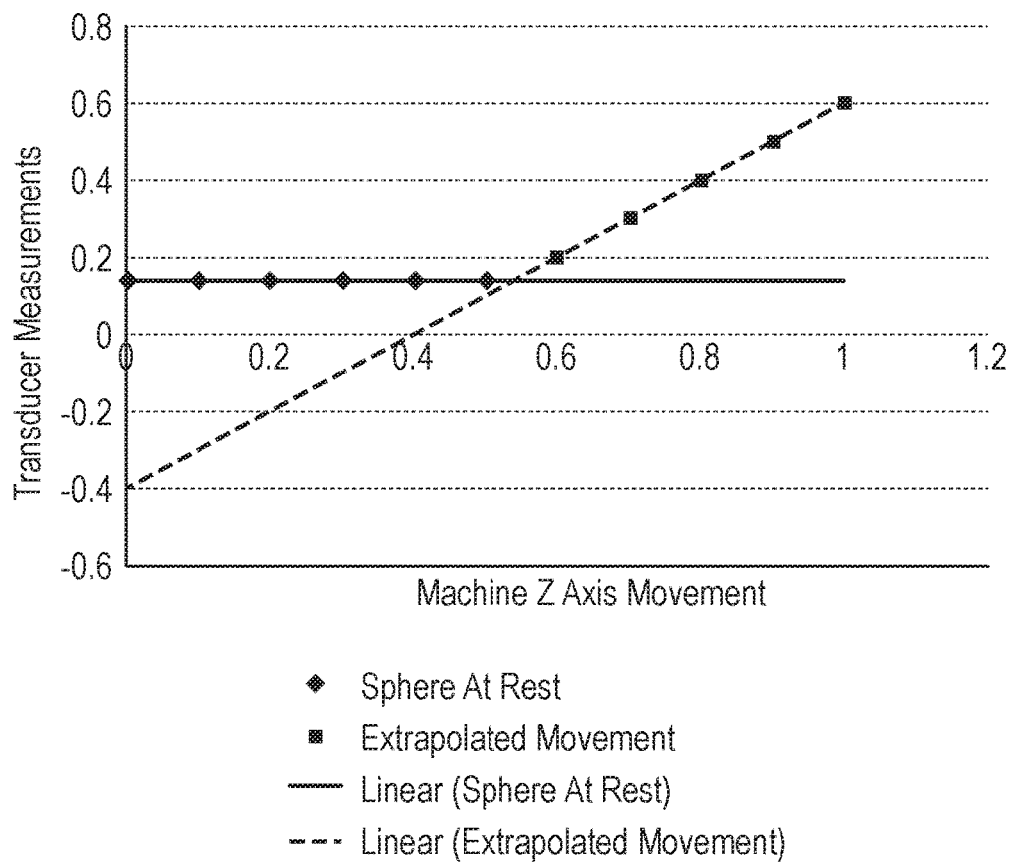
FIG. 6 shows how the sphere Z-height can be determined by backwards extrapolation to the known reference height "at-rest".

FIG. 6 shows that by plotting the centre point of each flat section of the transducer measurements against the known Z positions (working backwards from the final known position when it was in contact), linear extrapolation can then be used to calculate the position of the top dead centre of the sphere at zero transducer deflection (i.e. the value of Z when T indicates the sphere is at its home position). The top dead sphere centre position, the (known) reference tool 50 length and the (known) calibration sphere radius thus allow the sphere centre z-position to be calculated. One of the prior art techniques described above, for example a touch trigger measurement probe based technique, can then be used to measure the XY position of the centre of the sphere 32.

The above described device and method thus provide an automated technique for measuring the z-position of sphere. It should, of course, be noted that the definition of the various axes and co-ordinate systems are arbitrary. Although the nomenclature used by those skilled in the art has been used herein, this should in no way be seen as limiting the scope of the present invention. It should also be remembered many types of machine tool exist and the invention could be implemented on machine tools other the ones described herein. In particular, the relative motion between the workpiece and the cutting tool can be implemented in many different ways (e.g. translation of the table relative to a fixed position cutting tool, tilting of the spindle about one or more axes etc) and does not affect the benefits associated with the present invention.

The invention claimed is:

1. A calibration device for a machine tool, the device comprising:
   a base attachable to the machine tool;
   a calibration artefact having one or more known dimensions and being configured to define a reference or datum position for an automated machine tool calibration process in which a measurement probe of the machine tool measures a plurality of points on a surface of the calibration artefact to determine the reference or datum position;
   a deflection mechanism that attaches the calibration artefact to the base and allows movement of the calibration artefact relative to the base when an external force is applied to the calibration artefact, the deflection mechanism also maintaining the calibration artefact in a defined rest position relative to the base in the absence of an applied external force; and
   a sensor configured for sensing an extent of movement of the calibration artefact relative to the base when the external force is applied to the calibration artefact.

2. The device according to claim 1, wherein the calibration artefact comprises a sphere of known radius.

3. The device according to claim 1, wherein the calibration artefact is attached to a rod that protrudes from the base.

4. The device according to claim 1, wherein the deflection mechanism comprises a spring configured for biasing the calibration artefact into the defined rest position.

5. The device according to claim 1, wherein a force that biases the calibration artefact into the defined rest position is greater than a force that would be applied to the calibration artefact during the process in which the points on the surface of the calibration artefact are measured using the measurement probe.

6. The device according to claim 1, wherein the deflection mechanism comprises a first part attached to the calibration artefact and a second part attached to the base, wherein the first and second parts are configured so as to adopt a repeatable position relative to one another when brought into engagement with one another.

7. The device according to claim 1, wherein the calibration artefact is constrained to move along a single linear axis relative to the base.

8. The device according to claim 7, wherein the sensor is a transducer configured for measuring linear motion.

9. The device according to claim 1, wherein a wireless transmitter is configured for transmitting measurements taken by the sensor.

10. The device according to claim 1, wherein the base is configured for attachment to a bed or table of the machine tool.

11. A kit comprising a device according to claim 1, and at least one of a reference tool and a spindle-mounted measurement probe configured for mounting in a spindle of a machine tool.

12. A method for calibrating a machine tool, comprising:
   mounting a calibration device to the machine tool, the calibration device comprising:
      a base attachable to the machine tool;
      a calibration artefact having one or more known dimensions;
      a deflection mechanism that attaches the calibration artefact to the base and allows movement of the calibration artefact relative to the base when an external force is applied to the calibration artefact, the deflection mechanism also maintaining the calibration artefact in a defined rest position relative to the base in the absence of an applied external force; and
      a sensor configured for sensing an extent of movement of the calibration artefact relative to the base when the external force is applied to the calibration artefact; and
   using the calibration device to calibrate the machine tool.

13. The method according to claim 12, comprising moving a reference tool held by a spindle of the machine tool into contact with the calibration artefact of the calibration device thereby deflecting the calibration artefact.

14. The method according to claim 12, wherein the machine tool is calibrated by measuring a position of the calibration artefact with a measurement probe carried by the machine tool.

15. The method according to claim 14, wherein the machine tool is calibrated by measuring a plurality of points on a surface of the calibration artefact with the measurement probe of the machine tool to thereby determine a reference or datum position defined by the calibration artefact.

16. The method according to claim 12, wherein the calibration artefact of the calibration device comprises a sphere and the method comprises measuring a position of the center of the sphere.

* * * * *